Oct. 30, 1928.
E. M. LOFLAND
1,689,951
MANUFACTURE OF FERROUS HYDROXIDE
Filed Aug. 14, 1926
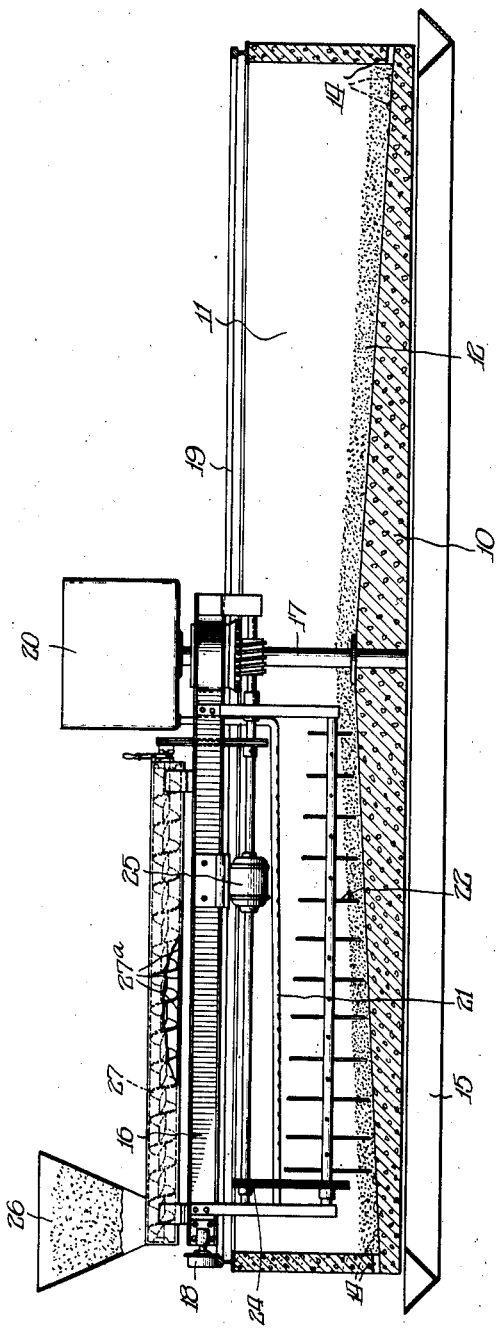
Witness:
R. Burkhardt
Inventor
Emil M. Lofland,
By Cromwell ——— ———
Attys.

Patented Oct. 30, 1928.

1,689,951

UNITED STATES PATENT OFFICE.

EMIL M. LOFLAND, OF CHICAGO, ILLINOIS.

MANUFACTURE OF FERROUS HYDROXIDE.

Application filed August 14, 1926. Serial No. 129,289.

This invention relates to a new form of hydrous ferrous oxide (herein referred to as "ferrous hydroxide") and to a process for the production or manufacture of same.

The general object of the invention is the production of a new form of ferrous hydrate or hydroxide having characteristics especially qualifying it for various uses.

Another object is the provision of a process for the production or manufacture of a new form of ferrous hydroxide, whereby it may be made in quantities at low cost.

Other objects of the invention will be indicated or pointed out hereinafter or will appear to one skilled in the art from the present disclosure or upon use of the material or process in practice.

In the accompanying drawing forming a part of this specification, the figure is a diagrammatic illustration in the nature of a sectional elevation of an apparatus which may be utilized in the practice of the process.

Ferrous hydroxide, $Fe(OH)_2$, has been produced by the precipitation process, which consists essentially in treating a soluble ferrous salt, such as iron sulfate, with an alkali, such as lime, and is basic or neutral as a product. Coincident with the precipitation of the ferrous hydroxide, an inert substance is thrown down which, unless separated out by further treatment, remains as an impurity in the product.

The present invention provides a process for the production of a ferrous hydroxide which is free from the impurities which occur incident to the precipitation process, much lighter in density, and possesses an unsatisfied base affinity. By this process the ferrous hydroxide is produced directly from metallic iron by oxidation, by a procedure involving the repeated wetting of iron, preferably in a comminuted form, such as borings, followed by the exposure of the wetted iron to oxygen at an effective concentration, such as in air, for a period of time to allow for the forming of a surface coating of ferrous hydroxide on the iron by the chemical reaction between the oxygen, the iron and the water, and then removing the coating by abrasion or attrition and washing, and finally recovering the material so removed. For the preservation of this material as a ferrous hydroxide I employ, for the wetting and washing of the iron, an aqueous solution of an acid or an acid salt which, for the purpose of promoting the reaction between the iron, the air and the water, should be made with an acid or acid salt which is in electrolyte.

The nature of the process will be understood with more particularity from an example which I will now explain, with reference to the form of apparatus illustrated in the drawing.

Clean metallic iron, in a comminuted form, such as iron borings, is distributed as a bed of approximately uniform thickness on the bottom 10 of a suitable basin 11.

This bed is designated in the drawing by the reference numeral 12, and should be limited to a depth permitting its being freely permeated by the air. In the arrangement shown, the basin is of circular form and has its bottom pitched from the center toward the side so as to give a draining slope toward the latter. The side wall is provided with distributed drainage openings 14 which discharge into a launder 15. A carriage frame 16 has rotary connection with the post 17 at the center of the basin and is supported at its other end by a roller 18 which travels on a track 19. Means is provided for slowly revolving the frame about the post 17 so that it will make a complete circuit of the basin in a certain period of time. A tank 20, which revolves with the frame, contains a weak solution of acid in water, which is showered from a pipe 21 on to the bed 12, incident to the revolution of the carriage. Mounted on the carriage, so as to revolve therewith, is an agitator 22 comprised of a rotary shaft carrying radially extending rods of such length that they may sweep through the depth of the bed 12. This agitator is driven by a sprocket and chain connection 24 which is actuated by a motor 25 mounted on the carriage. The carriage carries also a hopper 26 from which a screw conveyer 27 extends radially of the basin with discharge openings 27ª distributed along its length.

As the carriage revolves, the iron borings in the bed 12 are wetted with the aqueous solution, and after such wetting remain exposed to the air in their wetted condiion as the carriage moves on. During this period of exposure, a reaction takes place between the iron, the water and the air, resulting in the forming of a coating of ferrous hydroxide on each particle of the wetted iron. This period of exposure should be sufficiently long to permit of the forming of a coating of appreciable thickness, but inasmuch as the reaction slows down as the coating increases in thickness, a prolongation of the exposure period does not result in a commensurate increase in the hydroxide formed, and if left too long in contact with the iron, the ferrous hydroxide will be converted into a ferric oxide. I have found that an exposure period of approximately one-half hour is productive of optimum results. As the carriage revolves, the borings are subjected to energetic local agitation by the operation of the agitator 22. By this manipulation the particles of iron within the radius of action of the agitator are rubbed upon one another and the coatings of hydroxide scoured off by attrition, leaving the surfaces of the particles again clean and bare. At the same time, the borings in the portion of the bed undergoing this agitation are showered with the aqueous solution from the pipe 21, which flushing assists in the separation of the hydroxide from the iron particles and washes it away down the drainage slope of the bottom of the basin, from which it is discharged through the openings 14 into the launder 15 and conducted by the latter to a thickener wherein the excess of the solution is separated from the hydroxide and rendered available for reuse. The material as thus recovered is in the form of a sludge containing a considerable proportion of the acid salt solution. The iron particles, after thus being subjected to the agitation and washing for separation of the hydroxide from them, remain in the bed when the carriage has passed on, retaining a surface film of the aqueous solution from the recent washing. Thus they are in condition for further reaction with the oxygen of the air to which they are exposed, for the formation of new surface coatings of ferrous hydroxide. Thus the process goes on, in repetitions of the cycle above described incident to the revolution of the carriage. From time to time, as the bed becomes reduced in thickness by the conversion of the metallic iron to ferrous hydroxide and the removal of the latter in the manner described, it is replenished by the addition of new borings from the hopper 26, which are distributed over the bed by operation of the conveyor 27. By revolving the carriage at a speed requiring a definite period for it to complete the circuit of the basin, therefore, the operation may be carried on as a continuous procedure, the particles of the bed remaining quiet for most of the time in a condition for the forming of the coatings of hydroxide by the chemical reaction and being agitated locally in the bed at definite intervals for removal of the coatings and at the same time being washed to assist in the removal and carrying away of the hydroxide and to supply the requisite wetting to condition them for the continuation or resumption of the hydroxide-forming reaction.

The ferrous hydroxide thus obtained corresponds to the formula $FeO \cdot X H_2O$, or $Fe(OH)_2 \cdot X H_2O$, is of a bluish green color, of a flocculent form and of a light density, and possesses an acid characteristic or affinity for absorption of hydroxyl molecules, which characteristics render it of important utility in the manufacture of various compounds.

I have stated in the foregoing example that an aqueous solution of an acid or acid salt is utilized for the wetting and washing of the iron particles. The bluish green ferrous hydroxide may be actually produced in accordance with this method by the use of simply water for the wetting and washing. However, when simply water is used, the product, after its recovery in the ferrous form, due to its instability and hydroxyl molecule affinity, tends to become a ferrous-ferric compound resembling a magnetic oxide, as indicated by a change in color to black. This change is prevented by the production and recovery of the material in the presence of an acid or an acid salt solution. Since it is desirable to leave the iron particles, after the wetting or washing, in a condition most conducive to reaction with oxygen, it is best to use an acid or acid salt solution which is a carrier of oxygen. The selection and strength of the solution will depend upon the use to which the product is to be put. A solution satisfying most requirements, and which is also economical and easily handled, is a one to ten per cent solution of sulphuric acid. By reaction with the iron the acid forms, in situ, the acid salt, iron sulfate, and the desired result may be obtained by using a solution of such acid salt, instead of the acid solution, in the first instance. The temperature at which the reaction is carried on has some effect on the quality of the product as well as on the yield. Some heat is generated by the chemical reaction, and if the temperature is allowed to rise too high, other iron compounds may be formed which may be objectionable or defeat the utility of the product. While I have found it feasible to heat the solution to about 100° F., in ordinary operation it is satisfactory to use a cold solution.

Two factors which materially affect the yield are the extent of surface area of the iron available for the reaction, and facility of access of the oxygen to the metal. The use of the iron in a finely divided form, such as iron borings, gives a desirably large surface exposure and also, due to the mobility of the particles, facilitates the removal of the ferrous hydroxide coatings by agitation of the particles in contact with one another. The access of oxygen to the metal is promoted by proper limitation of the time that it is exposed to the action of the air, by proper control of the surface wetting, by the use of a wetting solution which is a carrier of oxygen, removal of the hydroxide coating while it is still in the ferrous form, and by adequate aeration of the wetted surfaces. Consequently, excessive thickness of the bed is disadvantageous because of the likelihood of its interfering with free air circulation to the particles. Air circulation in the bed may be promoted by the use of blowers for forcing the air through or into the same.

Apparatus herein disclosed but not herein claimed is claimed in my co-pending application for apparatus for production of oxides, Serial No. 273,838, filed April 30, 1928.

What I claim is:

1. Process for the manufacture of an iron compound which comprises wetting fragments of iron, subjecting the wetted fragments to the action of oxygen for a period adequate to permit the formation of coatings of ferrous hydroxide on the fragments, and then removing and recovering the material of these coatings before it is converted to the ferric form.

2. Process for the manufacture of ferrous hydroxide which comprises subjecting iron fragments to a surface wetting, exposing the wetted fragments in air for a period adequate to permit the formation thereon of surface coatings of ferrous hydroxide, and then removing and recovering the material of these coatings while it is of a bluish green color.

3. Process for the manufacture of ferrous hydroxide which comprises applying an aqueous surface film to iron fragments, subjecting surface portions of the iron to contact with oxygen to a point at which they are converted to ferrous hydroxide of a bluish green color, and removing and recovering this ferrous hydroxide as such.

4. Process for the manufacture of ferrous hydroxide which comprises applying an aqueous surface film to iron borings, exposing the wetted borings to the action of oxygen for a period adequate to convert surface portions of the iron to ferrous hydroxide, removing the ferrous hydroxide from the iron by rubbing the pieces upon one another, and recovering the ferrous hydroxide thus removed.

5. Process for the manufacture of a ferrous compound which comprises exposing wetted iron fragments in air for a period adequate to form surface coatings of ferrous hydroxide on the fragments, and then mechanically removing the material of said coatings from the iron before it is converted to the ferric form and recovering the material in the presence of an acid or acid salt solution.

6. Process of manufacturing ferrous hydroxide which comprises subjecting wetted surface portions of iron fragments to the action of oxygen in the presence of an acid salt to a point where they are converted to ferrous hydroxide of a bluish green color, and recovering the ferrous hydroxide from contact with the iron before it is converted to the ferric form.

7. Process for the manufacture of a ferrous compound which comprises wetting iron fragments, subjecting the surface portions of same to the action of oxygen to the point where they are converted to ferrous hydroxide, mechanically removing this ferrous hydroxide from the fragments before it is converted to the ferric form and recovering it in the presence of an acid salt solution.

8. Process for the manufacture of an iron compound which comprises wetting iron fragments with an acid salt solution, exposing the wetted fragments to the action of oxygen to the point where surface coatings of ferrous hydroxide are formed thereon, removing these coatings from contact with the iron by attrition and flushing before they are converted to the ferric form, and recovering the material of the removed coatings.

9. Process for the manufacture of an iron compound which comprises disposing iron fragments in a bed, subjecting the fragments to a surface wetting, exposing the wetted fragments to air for a period adequate to permit the formation thereon of surface coatings of ferrous hydroxide, stirring the fragments in the bed to remove the coatings by attrition before they are converted to the ferric form and removing the material of the coatings from the bed by flushing with a solution of an acid salt.

10. Process for the manufacture of an iron compound which comprises disposing iron fragments in a bed, giving the fragments a surface wetting, exposing the fragments in the bed to the action of air, agitating the bed locally and progressively to remove the coatings from the iron before they are converted to the ferric form and flushing the fragments during agitation with a solution of an acid salt.

11. A ferrous hydroxide formed by reaction of oxygen with metallic iron and corresponding to the formula $$Fe(OH)_2 \cdot X H_2O$$

and having an unsatisfied base affinity.

12. A ferrous hydroxide formed from metallic iron and corresponding to the formula $Fe(OH)_2 \cdot X H_2O$ and having an unsatisfied hydroxyl molecule affinity.

13. An iron compound consisting of ferrous hydroxide corresponding to the formula $Fe(OH)_2 \cdot X H_2O$ and having a bluish green color, and preserved in the form of a sludge with a solution of an acid salt.

14. An iron compound consisting of ferrous hydroxide preserved by an acid solution of a soluble salt of iron.

15. Process for the manufacture of an iron compound which comprises wetting surface portions of iron fragments with an aqueous acid solution, subjecting the wetted portions to the action of oxygen to an extent where they are converted to ferrous hydroxide, removing the ferrous hydroxide from the fragments before it is converted to the ferric form, and recovering the ferrous hydroxide.

16. Process for the manufacture of an iron compound which comprises wetting iron fragments with an aqueous solution of an iron salt, subjecting the wetted surface portions of the fragments to the action of oxygen to the point where they are converted to ferrous hydroxide, mechanically removing the ferrous hydroxide from the iron, and collecting the removed hydroxide in the presence of an acid solution of a soluble salt of iron.

17. Process of manufacture of an iron compound which comprises disposing iron fragments in a bed, subjecting the fragments to a surface wetting, exposing the wetted fragments to the air for a period adequate to permit the conversion of surface portions thereof to ferrous hydroxide, stirring the fragments in the bed to remove the ferrous hydroxide by attrition, and recovering the ferrous hydroxide in the presence of an acid solution of an iron salt before it is converted to the ferric form.

18. Process for the manufacture of an iron compound which comprises disposing iron fragments in a bed, giving the fragments a surface wetting, exposing the fragments in the bed to the action of air to an extent permitting the conversion of surface portions thereof to ferrous hydroxide, agitating the fragments in the bed to remove the ferrous hydroxide from the iron, flushing the fragments with an electrolytic acid solution during such agitation, and recovering the removed ferrous hydroxide while wet with the solution.

19. A process of producing an iron compound which comprises reacting metallic iron with oxygen in the presence of an electrolyte to an extent whereat hydrous ferrous oxide is formed on the surface portions of the iron, removing the hydrous ferrous oxide from the metallic iron before it is converted to the ferric form, so as to expose the metallic iron for contact with the oxidizing reagent, and recovering the removed hydrous ferrous oxide in the presence of an acid salt solution.

20. Process of producing hydrous ferrous oxide which comprises alternately wetting and oxidizing metallic iron and periodically removing from the surface of the iron the hydrous ferrous oxide formed by the oxidizing reaction, to expose the metallic iron for contact with the oxidizing agent, and recovering the removed hydrous ferrous oxide before it is converted to the ferric form.

21. Process of producing an iron compound which comprises reacting wetted iron fragments with oxygen to a point where surface portions are converted to hydrous ferrous oxide, removing the ferrous oxide from the fragments by attrition while flushing the fragments with an acid salt solution, collecting the removed ferrous oxide with the flushing solution, and removing excess of the solution to leave the hydrous ferrous oxide in the form of a sludge wet with some of the solution.

22. Process of producing an iron compound which comprises disposing iron fragments in a bed, wetting the fragments, subjecting the wet fragments to reaction with oxygen to the point where surface portions are converted to ferrous hydroxide, agitating the fragments in the bed to effect detachment of ferrous oxide from them, flushing the fragments with an acid salt solution to effect removal of the ferrous hydroxide from the bed, gathering the ferrous hydroxide and the solution, and removing an excess portion of the solution to leave the ferrous hydroxide in the form of a sludge wet with the solution.

In testimony whereof I have hereunto signed my name.

EMIL M. LOFLAND.